(12) United States Patent
Brandenstein et al.

(10) Patent No.: US 8,965,615 B2
(45) Date of Patent: Feb. 24, 2015

(54) METHOD FOR THE ENERGY-OPTIMIZED OPERATION OF A FLOOR-BOUND HEAVY-DUTY TRANSPORTATION VEHICLE THAT CAN BE DISPLACED ON RUBBER TIRES AND HAS AN ELECTRIC DRIVE

(75) Inventors: Dirk Brandenstein, Willich (DE); Uwe Brucherseifer, Gummersbach (DE); Branislav Lalik, Duisburg (DE); Heiko Schulz, Düsseldorf (DE)

(73) Assignee: Terex MHPS GmbH, Düsseldorf (DE)

( * ) Notice: Subject to any disclaimer, the term of this patent is extended or adjusted under 35 U.S.C. 154(b) by 53 days.

(21) Appl. No.: 13/698,563

(22) PCT Filed: May 4, 2011

(86) PCT No.: PCT/EP2011/057103
§ 371 (c)(1),
(2), (4) Date: Jan. 15, 2013

(87) PCT Pub. No.: WO2011/144443
PCT Pub. Date: Nov. 24, 2011

(65) Prior Publication Data
US 2013/0204475 A1    Aug. 8, 2013

(30) Foreign Application Priority Data

May 18, 2010    (DE) .......................... 10 2010 020 906

(51) Int. Cl.
*B60L 11/08*    (2006.01)
*B60L 15/20*    (2006.01)
(Continued)

(52) U.S. Cl.
CPC ................. *B60L 15/20* (2013.01); *B60L 11/08* (2013.01); *B60L 11/1803* (2013.01);
(Continued)

(58) Field of Classification Search
CPC .................................. G06F 17/00; B60L 11/08
See application file for complete search history.

(56) References Cited

U.S. PATENT DOCUMENTS 6,777,846 B2 *    8/2004    Feldner et al. ................ 310/200
6,799,096 B1    9/2004    Franke et al.
(Continued)

FOREIGN PATENT DOCUMENTS

DE    9422016 U1    9/1997
DE    60214777 T2    9/2007
(Continued)

OTHER PUBLICATIONS

English translation of International Preliminary Report on Patentability from corresponding International Application PCT/EP2011/057103.
(Continued)

*Primary Examiner* — John Q Nguyen
*Assistant Examiner* — Michael Kerrigan
(74) *Attorney, Agent, or Firm* — Gardner, Linn, Burkhart & Flory, LLP

(57) ABSTRACT

A method for operating a floor-bound heavy-duty transportation vehicle that can be displaced on rubber tires, such as a heavy-duty transportation vehicle that may be operated without a driver, comprising an electric drive having at least two electric motors. In order to improve the overall efficiency of the electric drive of a floor-bound heavy-duty transportation vehicle, the at least two electric motors are operated using optimized variables by a drive control and according to the operational conditions of the heavy-duty transportation vehicle and its performance requirements.

3 Claims, 3 Drawing Sheets

(51) Int. Cl.
  *B60L 11/18* (2006.01)
  *B60L 15/02* (2006.01)
  *B60L 11/02* (2006.01)
  *H02P 3/18* (2006.01)

(52) U.S. Cl.
  CPC .......... *B60L 15/025* (2013.01); *B60L 15/2045* (2013.01); *B60L 11/02* (2013.01); *H02P 3/18* (2013.01); *B60L 2260/28* (2013.01); *B60L 2270/145* (2013.01); *Y02T 10/643* (2013.01); *Y02T 10/646* (2013.01); *Y02T 10/7005* (2013.01); *Y02T 10/7077* (2013.01); *Y02T 10/7283* (2013.01); *Y02T 10/648* (2013.01)
  USPC .......................................................... 701/22

(56) References Cited

U.S. PATENT DOCUMENTS

| | | | | |
|---|---|---|---|---|
| 7,747,363 | B1* | 6/2010 | Tang | ................................ 701/22 |
| 2002/0113564 | A1 | 8/2002 | Reile et al. | |
| 2006/0001318 | A1 | 1/2006 | Ahmad et al. | |
| 2008/0060542 | A1 | 3/2008 | Bakran et al. | |
| 2008/0300744 | A1* | 12/2008 | Katsuta et al. | ................... 701/22 |
| 2009/0069142 | A1 | 3/2009 | Welchko et al. | |
| 2010/0327798 | A1 | 12/2010 | Stichweh | |

FOREIGN PATENT DOCUMENTS

| | | |
|---|---|---|
| DE | 102006042945 A1 | 4/2008 |
| DE | 102007058209 B4 | 10/2009 |
| EP | 1202895 B1 | 7/2000 |

OTHER PUBLICATIONS

International Search Report completed Oct. 19, 2011, from corresponding International Application No. PCT/EP2011/057103.

Written Opinion of the International Searching Authority for International Application No. PCT/EP2011/07103.

Gottwald Port Technology GmbH Brochure—Published Jun. 2008.

* cited by examiner

METHOD FOR THE ENERGY-OPTIMIZED OPERATION OF A FLOOR-BOUND HEAVY-DUTY TRANSPORTATION VEHICLE THAT CAN BE DISPLACED ON RUBBER TIRES AND HAS AN ELECTRIC DRIVE

CROSS REFERENCE TO RELATED APPLICATION

The present application claims the priority benefits of International Patent Application No. PCT/EP2011/057103, filed on May 4, 2011, and also of German Patent Application No. DE 10 2010 020 906.6, filed on May 18, 2010, which are hereby incorporated herein by reference in their entireties.

BACKGROUND OF THE INVENTION

The invention relates to a method of operating a floor-bound heavy-duty transport vehicle, in particular a heavy-duty automated guided vehicle, having an electric travel drive which comprises at least two electric motors.

A Gottwald Port Technology GmbH brochure entitled "Gottwald Lift AGV" discloses a floor-bound heavy-duty automated guided vehicle for ISO containers. The heavy-duty transport vehicle has an unladen weight of about 34 t and a load capacity of 60 t, which means that in the loading condition a total weight of about 94 t is achieved. The transport vehicle which is designed as a four-wheel vehicle consists substantially of a vehicle frame having a front axle and a rear axle, on opposite ends of which a wheel fitted with a tire is mounted in each case. The vehicle frame supports a planar platform which can be lifted or lowered and which is used to receive the ISO containers which are to be transported. The heavy-duty transport vehicle is driven by a diesel-electric drive with an internal combustion engine, a three-phase generator and a first electric motor and a second electric motor. The first electric motor drives the front axle and the second electric motor drives the rear axle. Between the front axle and the rear axle and beneath the vehicle frame, space is provided for suspension of control boxes and for installation of the internal combustion engine.

SUMMARY OF THE INVENTION

The object of the present invention in the case of a floor-bound heavy-duty transport vehicle is to improve the overall efficiency of the electric travel drive.

In accordance with an embodiment of the invention, in the case of a method of operating a floor-bound heavy-duty transport vehicle which can travel on rubber tires, such as a heavy-duty automated guided vehicle, having an electric travel drive which comprises at least two electric motors, an improvement in the overall efficiency of the electric travel drive is achieved by virtue of the fact that by means of a drive control the at least two electric motors are operated with characteristic map optimization according to the operating conditions of the heavy-duty transport vehicle and its performance requirement. By means of the control with characteristic map optimization, the energy consumption of the electric travel drive is reduced considerably. It is thereby possible to prevent the electric motors of the heavy-duty transport vehicle, which are designed for maximum performance for operation in the loaded condition, from being operated frequently only with low performance requirements.

A heavy-duty transport vehicle is preferably understood to be a vehicle whose loading capacity per centre line is greater than or equal to 10 t. Heavy-duty transport vehicles of this type are particularly suitable for transportation of ISO containers.

In a particular embodiment, it is provided that by means of the drive control at least one of the at least two electric motors is switched on and off during continuous operation in dependence upon the given operating conditions of the heavy-duty transport vehicle and its performance requirement. As a consequence, a further improvement in the overall efficiency of the electric travel drive is achieved.

In connection with characteristic map control, the electric motors are designed as three-phase motors, such as asynchronous motors which are controlled with vector control or DTC (direct torque control) via inverters.

In accordance with a particular aspect the acceleration, rotational speed and the active and idle current of the electric motors are detected by the drive control and inverters, and the loading of the electric motors is determined thereby.

In a particular embodiment, it is provided that when the electric motors are operated in parallel and a loading of the electric motors is determined to be below a specified minimum loading, at least one of the electric motors is switched off, and that when the electric motors are operated at minimum level and a loading of the electric motors is determined to be above a specified maximum loading of the electric motors being operated, at least one further electric motor which is in drag operation is switched on.

In order to load the entire drive train with the lowest possible torque impulses, it is provided that a switching-on and/or switching-off of the electric motors is controlled by the drive control with a controlled torque transfer between the electric motors. As a consequence, the travel behaviour of the heavy-duty transport vehicle is also not negatively influenced and a constant travel drive remains achieved.

In a particular embodiment, it is provided that prior to switching on the electric motors the rotational speed and/or phase position of the electric motors being operated at minimum level is detected and the rotational speed and/or phase position of the electric motor to be switched on is adapted thereto.

In a first alternative embodiment, it is provided that the electric travel drive is designed as a diesel-electric travel drive which comprises an internal combustion engine and a three-phase generator.

In a second embodiment as an alternative to this, it is provided that the electric travel drive is designed as a battery-electric travel drive which comprises a traction battery.

The invention will be explained in greater detail hereinunder with reference to an exemplified embodiment illustrated in the accompanying drawings.

BRIEF DESCRIPTION OF THE DRAWINGS

FIG. 1 shows a schematic view of a floor-bound heavy-duty automated guided vehicle 1 which can travel on rubber tires. The transport vehicle 1 which is designed as a four-wheel vehicle comprises a vehicle frame 2, on which two front wheels 4a are mounted on a common front axle 3a and two rear wheels 4b are mounted on a common rear axle 3b. The four wheels 4a, 4b are provided with tires, such as air-filled rubber tires. The vehicle frame 2 supports a planar platform which is used to receive the loads which are to be transported. In this case, the heavy-duty transport vehicle 1 is designed such that loads to be transported weighing 10 t or greater can be transported per centre line of the heavy-duty vehicle 1. It is self-evident that the heavy-duty transport vehicle 1 can have more than just the two illustrated axles (3a, 3b), of which all or some can be driven.

Figure 1:
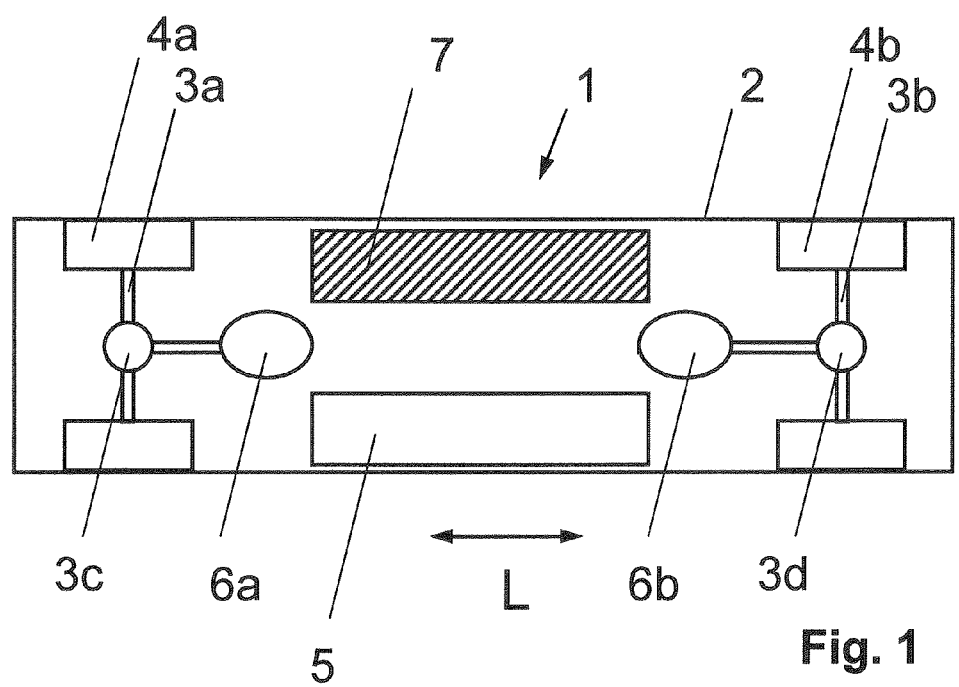
FIG. 1 shows a schematic view from below of a floor-bound heavy-duty automated guided vehicle which can travel on rubber tires.

It is apparent that as seen in the longitudinal direction L of the heavy-duty transport vehicle 1, a power supply unit 5 is disposed on the vehicle frame 2 and between the front axle 3a and the rear axle 3b and can be designed as a diesel-electric drive with an internal combustion engine and supplies power to a first front electric motor 6a and a second rear electric motor 6b. As seen in the longitudinal direction L of the heavy-duty transport vehicle 1, the front electric motor 6a is attached centrally and in the region of the front axle 3a underneath the vehicle frame 2 and on the output-side drives the two front wheels 4a via a first front transfer gearbox 3c. As seen in the longitudinal direction L of the heavy-duty transport vehicle 1, the rear electric motor 6b is likewise attached centrally and in the region of the rear axle 3b underneath the vehicle frame 2 and on the output-side drives the two rear wheels 4b via a second rear transfer gearbox 3d.

A power supply unit is to be understood to be either a diesel-electric drive with an internal combustion engine, a three-phase generator and a generator actuator or a battery-electric drive with a traction battery.

In the case of one embodiment of the power supply unit 5, the diesel-electric drive is provided in the form of an internal combustion engine 6a, in particular a diesel engine, whose generated mechanical energy is converted with the aid of a three-phase generator and a generator actuator into electric energy in the form of a direct current. In this case, the generator actuator is a so-called boost converter.

It is also apparent that between the front axle 3a and the rear axle 3b space is provided for suspension of control boxes 7 underneath the vehicle frame 2, in order to receive control components.

Figure 2:
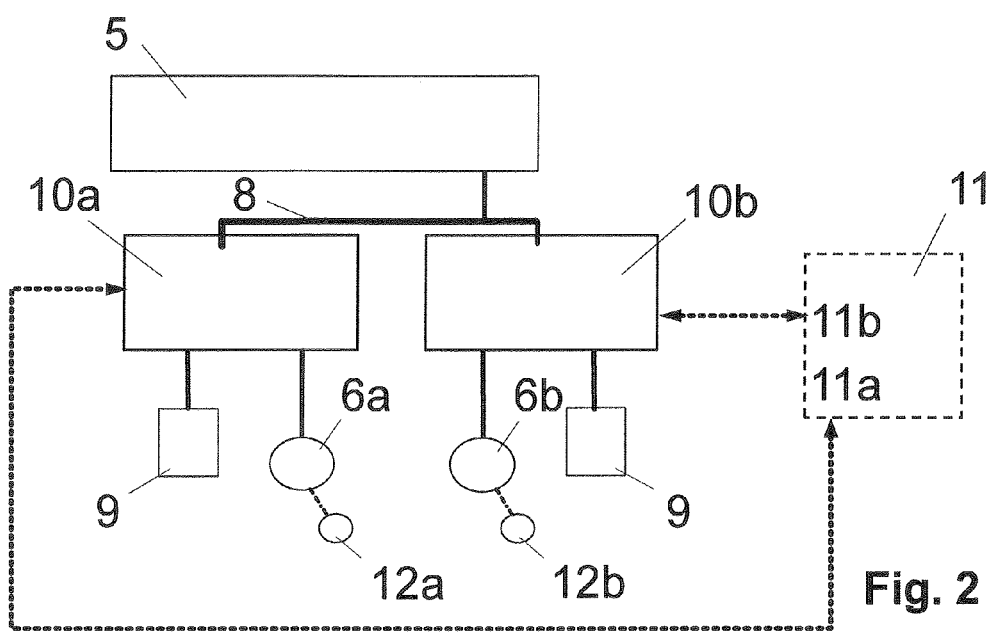
FIG. 2 shows a block diagram of a diesel-electric or battery-electric travel drive of the heavy-duty transport vehicle of FIG. 1.

FIG. 2 shows a block diagram of the diesel-electric or battery-electric travel drive of the heavy-duty transport vehicle 1 of FIG. 1.

The power supply unit 5 provides the drive train with the required electric energy in the form of a direct voltage. The term "drive train" is understood to be all components of the heavy-duty transport vehicle 1 which transmit the torque from the electric motors 6a, 6b to the road. Connected to the direct voltage intermediate circuit 8, in each case via an inverter 10a, 10b are electric motors 6a, 6b, which are operated with rotational speed control. The electric motors 6a, 6b are designed as three-phase motors, in particular as asynchronous motors which are controlled with vector control by means of the inverters 10a, 10b.

Then, the electric energy is converted by the electric motors 6a, 6b into mechanical drive energy to drive the heavy-duty transport vehicle 1 forwards. The first and second electric motors 6a, 6b are connected to the direct voltage circuit 8 via a first inverter 10a and a second inverter 10b. The frequency and the voltage and therefore the rotational speed and the torque for the first electric motor 6a and the second electric motor 6b can be adapted to the respective driving situation via the first and second inverters 10a, 10b. As a consequence, the transfer of power from the power supply unit 5 to the two electric motors 6a, 6b can be controlled electronically. For this purpose, the two electric motors 6a, 6b and the two respectively allocated inverters 10a, 10b are connected in each case in terms of control technology to a higher-ranking drive control 11.

The heavy-duty transport vehicle 1 is also braked via the two electric motors 6a, 6b. The energy fed back into the direct voltage circuit 8 by the two electric motors 6a, 6b during braking is directed into a brake chopper—connected to the direct voltage circuit 8—and braking resistors 9 and is converted into heat and thus eliminated.

As stated previously, the two electric motors 6a, 6b are designed as three-phase motors, in particular as asynchronous motors which are controlled with vector control via the inverters 10a, 10b. All of the electric motors 6a, 6b are operated with rotational speed control and torque control. The rotational speed of the electric motors 6a, 6b is tracked in accordance with the required travel speed. Depending upon the operating state of the heavy-duty transport vehicle 1, for example, empty travel, travel with a low loading or travel with maximum loading, uphill travel, downhill travel or cornering, the two inverters 10a, 10b are controlled via the drive control 11 such that the two electric motors 6a, 6b provide sufficient torque in accordance with their characteristic map. In the case of a heavy-duty transport vehicle 1, there is a high mass ratio between a maximum-loaded heavy-duty transport vehicle 1 and an empty heavy-duty transport vehicle 1 which amounts to approximately 3.5. By reason of these different operating states, the performance and torque requirements of the two electric motors 6a, 6b vary to a very significant extent and maximum performance of the two electric motors 6a, 6b is required only occasionally.

It is thus provided that the two electric motors 6a, 6b are controlled with characteristic map optimization by means of the drive control 11 and the inverters 10a, 10b allocated to the respective electric motors 6a, 6b. In this case, the electric motors 6a, 6b are utilised to the same extent if both electric motors 6a, 6b are in dual operation or when more than two electric motors 6b, 6c are in multiple operation. Within the scope of this characteristic map-optimized control, it is provided that in operating states with a low loading of the heavy-duty transport vehicle 1—such as e.g. during empty travel—one of the two electric motors 6a, 6b is switched off during the continuous operation. Switching off one of the two electric motors 6a, 6b brings about for instance a loading, which is twice as high, of the driving electric motor of the two electric motors 6a, 6b, whose performance is sufficient for operation at a lower power requirement, in this case empty travel. Switching off one of the two electric motors 6a, 6b can save energy without negatively influencing the drive operation of the heavy-duty transport vehicle 1. In relation to the electric motor 6a, 6b which remains in operation, a displacement of its operating point is advantageously affected in the direction of a higher torque at the same rotational speed, which leads to a higher level of efficiency. By switching off one of the two electric motors 6a, 6b, the energy consumption of the heavy-duty transport vehicle 1 is reduced considerably.

The characteristic map-optimized control of the two electric motors 6a, 6b is affected via the drive control 11 which for this purpose has a master drive circuit 11a and a slave drive circuit 11b. The master drive circuit 11a is allocated to the first electric motor 6a and is designated as the "master", since the allocated electric motor 6a is not switched off during the drive operation. Correspondingly, the slave drive circuit 11b which is allocated to the electric motor 6b to be switched off is designated as the "slave". In order to load the electric motors 6a, 6b in a balanced manner, it is basically also possible to change the master and slave functions in accordance with a predetermined model. The master drive circuit 11a and also the slave drive circuit 11b monitor the respectively allocated electric motor 6a, 6b or its inverter 10a, 10b via corresponding first sensors 12a and second sensors 12b. The rotational speeds of the electric motors 6a, 6b are detected via the first and second sensors 12a, 12b. The current, acceleration and/or torque of the electric motors 6a, 6b are detected via the inverters 10a, 10b. By reference to the measurement data, utilisation of the respective first or second electric motor 6a, 6b is determined in the master drive circuit 11a and the slave drive circuit 11b.

Should utilisation, which is below a preset minimum utilisation, be determined in the slave drive circuit 11b, this is communicated to the inverter 10a and the second electric motor 6b is switched off via switch-off logic integrated in the slave drive circuit 11b. For this purpose, the impulses to the second inverter 10b are blocked and the second electric motor 6b is thus coupled in motion without current in a so-called drag operation.

In order to prevent the drive train or the drive control 11 from being loaded by a torque jerk by virtue of the fact that one of the electric motors 6a, 6b is switched on or off, it is provided that the drive control 11 controls the switching-off of the second electric motor 6b with a controlled torque transfer from the second electric motor 6b, which is to be switched off, to the first electric motor 6a which is to be loaded to a greater extent. As a result, the second electric motor 6b which is to be switched off outputs its proportion of power slowly and the first electric motor 6a which is to be loaded to a greater extent accepts this proportion of power until the second electric motor 6b eventually runs along therewith without current in a drag operation.

In the event that the first electric motor 6a is operating alone or in the case of more than two electric motors 6a, 6b only some of the electric motors are operating at minimum level, and in the master drive circuit 11a utilisation is determined which is above a preset maximum utilisation of the first electric motor 6a operating alone or some of the electric motors operating at minimum level, this is communicated to the first inverter 10a and the second electric motor 6b is then switched on via the slave drive circuit 11b. For this purpose, the impulses of the second inverter 10b are then released and as a result the second electric motor 6b then starts up, which means that both electric motors 6a, 6b drive the heavy-duty transport vehicle 1 on an equal basis in dual operation. This type of increased utilisation can be affected by virtue of the fact that the heavy-duty transport vehicle 1 receives a load. The power requirement of the first electric motor 6a operating alone increases as a result, and on the one hand the operating point of the first electric motor 6a could move from the optimum efficiency range in the characteristic map, and on the other hand it could reach its maximum power limit in an extreme case. This is compensated for in accordance with the invention in that the operating point of the two electric motors 6a, 6b in the combined characteristic map is then returned to an optimum efficiency range by switching on the second electric motor 6b which has been switched to zero current.

In order to ensure that the power supply unit 5 and/or the first electric motor 6a are not suddenly loaded by the second electric motor 6b being switched on, it is provided that the drive control 11 controls the switching-on of the second electric motor 6b with a controlled torque transfer from the first electric motor 6a operating alone to the second electric motor 6b which is to be switched on. As a result, the first electric motor 6a operating alone outputs its proportion of power slowly and the second electric motor 6b which is to be switched on accepts this proportion of power until the first electric motor 6a finally drives on an equal basis. Moreover, when the currentless second electric motor 6b is switched on, the development of phase-oppositional short-circuit currents is avoided, in that prior to switching on the currentless second electric motor 6b the rotational speed and/or phase position thereof is/are detected and is taken into account upon release the impulse of the second inverter 10b. Moreover, when the second electric motor 6b is switched on, synchronisation with the first electric motor 6a operating alone is observed and is maintained.

Figure 3:
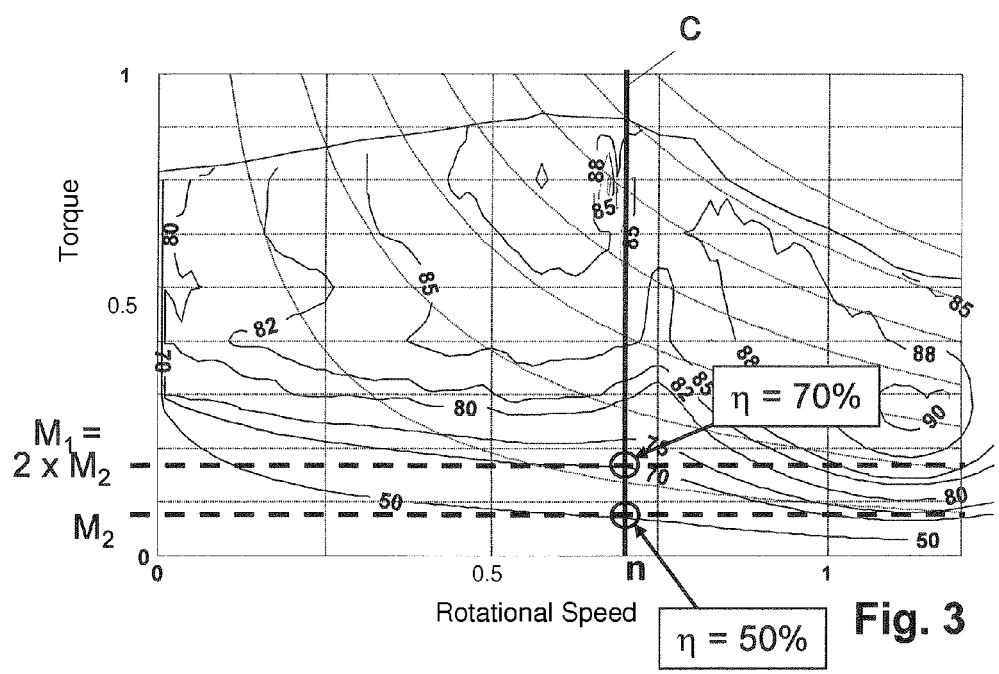
FIG. 3 shows a characteristic map of the efficiency of one of the electric motors of the heavy-duty transport vehicle of FIG. 1.

FIG. 3 shows by way of example an efficiency characteristic map of the—in this embodiment—identically constructed electric motors 6a, 6b of a heavy-duty transport vehicle 1 which is designed as a four-wheel vehicle and has two centre lines and two electric motors 6a, 6b for the travel drive. The characteristic map shows the efficiency η of the electric motor 6a, 6b as a function of its rotational speed in revolutions per minute [1/min] which is plotted on the x-axis, and of its torque in Newton-meters [Nm] which is plotted on the y-axis. The advantages of the invention are illustrated by reference to an example comparing the operation of the heavy-duty transport vehicle 1 having an electric motor 6a to an operation of the heavy-duty transport vehicle 1 having two electric motors 6a, 6b.

A first upper line M1 which is in parallel with the x-axis represents the torque, which is provided by an electric motor 6a, for operation of the heavy-duty transport vehicle 1. The electric motor 6b provides torque M1. A second lower line M2 which also is in parallel with the x-axis represents in each case the torque, which provided by the two electric motors 6a, 6b, for operation of the heavy-duty transport vehicle 1. Each of the two electric motors 6a, 6b provides torque M2. M1 is equal to twice M2.

In the case of a rotational speed of the electric motor 6a or the two electric motors 6a, 6b which is proportional to the travel speed of the heavy-duty transport vehicle 1 which is shown in the diagram by the third line c which is in parallel with the Y-axis, a level of efficiency η of about 70% is achieved for the electric motor 6a and in each case a level of efficiency η of about 50% is achieved for the two electric motors 6a, 6b.

It is apparent from this that by switching off one of the two with the same torque an increase in efficiency of 20% can be achieved with energy consumption reduced accordingly. Moreover, there are no losses of the switched off electric motor 6a, 6b.

The fields of application of the described heavy-duty transport vehicles 1 include the handling of ISO containers in docklands and in intermodal transport between road and rail.

The present invention has been described by reference to a floor-bound, heavy-duty automated guided vehicle 1 which can travel on rubber tires. Essentially, it is possible to use this type of heavy-duty transport vehicle 1 to transport heavy loads, such as e.g. ISO containers, swap containers, containers, slabs or coils in metallurgy, steel and rolling mill technology. In one embodiment of the heavy-duty transport vehicle 1 for transportation of ISO containers, the heavy-duty transport vehicle 1 can have an unladen weight of about 35 t. The weight of the ISO container to be transported is then added to this, which means that in the loading condition a total weight of about 95 t is achieved. The heavy-duty transport vehicle 1 can be equipped with a platform for receiving the load which is to be transported, or with a device for receiving or depositing the load. Furthermore, the exemplified embodiment is related to a power supply unit 5 which supplies two electric motors 6a, 6b which in each case drive the wheels 4a, 4b of an axle 3a, 3b. It is also feasible to have a single-wheel drive having four electric motors, or a construction of the heavy-duty transport vehicle 1 having more than two axles in terms of a multiple-axle vehicle incorporating a corresponding increase in the number of electric motors. Several axles can be without a drive or can be drivingly connected to a common electric motor. Instead of for driverless operation, the heavy-duty transport vehicle 1 can also be equipped with a driver's cab for manned operation.

LIST OF REFERENCE NUMERALS

1 heavy-duty transport vehicle
2 vehicle frame
3a front axle
3b rear axle
3c front transfer gearbox
3d rear transfer gearbox
4a front wheels
4b rear wheels
5 power supply unit
6a first front electric motor
6b second rear electric motor
7 control boxes
8 direct voltage circuit
9 braking resistors
10a first inverter
10b second inverter
11 drive control
11a master drive circuit
11b slave drive circuit
12a first sensors
12b second sensors
M1 first line
M2 second line
a third line
L longitudinal direction

The invention claimed is:

1. Method of operating a floor-bound heavy-duty transport vehicle which can travel on rubber tires and whose loading capacity per centre line is greater than or equal to 10 t, having an exclusively electric travel drive which comprises at least two electric motors, wherein a drive control operates the at least two electric motors with characteristic map optimization according to the operating conditions of the heavy-duty transport vehicle and its performance requirement, wherein the drive control operatively switches at least one of the at least two electric motors on and off during continuous operation in dependence upon the given operating conditions of the heavy-duty transport vehicle and its performance requirement, and wherein via the drive control and the inverters the acceleration, rotational speed and the active and idle current of the electric motors are measured, and the loading of the electric motors is determined thereby, and when the electric motors are operated in parallel and a loading of the electric motors is determined to be below a specified minimum loading, at least one of the electric motors is switched off, and when the electric motors are operated at minimum level and a loading of the electric motors is determined to be above a specified maximum loading of the electric motors being operated, a further electric motor which is in drag operation is switched on, wherein the electric motors comprise three-phase asynchronous motors and are controlled with vector control or DTC (direct torque control) via the inverters, wherein at least one of switching-on and switching-off of the electric motors is controlled by the drive control with a controlled torque transfer between the electric motors, and wherein prior to switching on at least one of the electric motors at least one of the rotational speed and phase position of the electric motors being operated at minimum level is detected and at least one of the rotational speed and phase position of the at least one electric motor to be switched on is adapted thereto.

2. The method of claim 1, further including a power supply for the electric travel drive, and wherein the power supply unit is a diesel-electric travel drive which comprises an internal combustion engine and a three-phase generator.

3. The method of claim 1, wherein the electric travel drive is designed as a battery-electric travel drive which comprises a traction battery.

\* \* \* \* \*